US006776006B2

(12) United States Patent
Best et al.

(10) Patent No.: US 6,776,006 B2
(45) Date of Patent: Aug. 17, 2004

(54) METHOD TO AVOID STRIAE IN EUV LITHOGRAPHY MIRRORS

(75) Inventors: Michael E. Best, Ogdensburg, NY (US); Claude L. Davis, Jr., Painted Post, NY (US); Mary J. Edwards, Ogdensburg, NY (US); Thomas W. Hobbs, Canton, NY (US); Gregory L. Murray, Potsdam, NY (US)

(73) Assignee: Corning Incorporated, Corning, NY (US)

( * ) Notice: Subject to any disclaimer, the term of this patent is extended or adjusted under 35 U.S.C. 154(b) by 434 days.

(21) Appl. No.: 09/943,252

(22) Filed: Aug. 30, 2001

(65) Prior Publication Data

US 2002/0043080 A1 Apr. 18, 2002

Related U.S. Application Data

(60) Provisional application No. 60/240,303, filed on Oct. 13, 2000.

(51) Int. Cl.[7] .............................................. C03B 23/025
(52) U.S. Cl. .............................. 65/17.4; 65/17.6; 65/61; 65/64; 65/107
(58) Field of Search ................................ 65/17.4, 17.6, 65/61, 64, 107

(56) References Cited

U.S. PATENT DOCUMENTS

| 2,239,551 A | | 4/1941 | Dalton et al. ................... 49/79 |
| 2,272,342 A | | 2/1942 | Hyde .......................... 49/78.1 |
| 3,130,029 A | * | 4/1964 | Cala ............................. 65/35 |
| 3,155,748 A | * | 11/1964 | Couri .......................... 264/1.21 |
| 3,560,182 A | * | 2/1971 | Golightly ...................... 65/107 |
| 3,930,824 A | * | 1/1976 | Knowles ........................ 65/37 |
| 3,958,052 A | | 5/1976 | Galusha et al. |

(List continued on next page.)

FOREIGN PATENT DOCUMENTS

| EP | 0 055 077 | 6/1982 | |
| EP | 0 252 734 | 1/1988 | ............. G03F/7/20 |
| EP | 0 279 670 | 8/1988 | ............. G03F/1/00 |
| EP | 0 569 123 | 11/1993 | ............. G03F/1/14 |
| EP | 0 708 367 | 4/1996 | ............. G03F/1/00 |
| EP | 0 710 890 | 5/1996 | ............. G03F/7/20 |
| EP | 0 779 528 | 6/1997 | ............ G02B/17/08 |
| EP | 0 809 125 | 11/1997 | ............ G02B/6/38 |
| EP | 0 903 605 | 3/1999 | ............ G02B/13/14 |
| JP | 60-173551 | 9/1985 | ............. G03C/5/08 |
| JP | 63-142301 | 6/1988 | ............ G02B/1/10 |
| JP | 63-142302 | 6/1988 | ............ G02B/1/10 |
| WO | WO 87/06028 | 10/1987 | ............. G03F/1/00 |
| WO | 98/34234 | 8/1998 | ............ G21G/4/00 |
| WO | WO 01/07967 | 2/2001 | ............ G03C/5/00 |
| WO | WO 01/08163 | 2/2001 | |
| WO | WO 01/75522 | 10/2001 | ............. G03F/1/14 |

OTHER PUBLICATIONS

Tanya E. Jewell, Four–Mirror Ring–Field System for EUV Projection Lithography, 1994, pp. 98–102.
High Purity Quartz Glass Products, May 17, 1999, http://www.toshiba–ceramics.com/quartz.html, pp. 1–2.
Shin–Etsu Chemical Homepage, Semiconductor Materials Division, May 17, 1999, http://www.shinetsu.co.jp/english/profile/division/sem–div/sem–div.html, pp. 1–2.

(List continued on next page.)

*Primary Examiner*—Sean Vincent
(74) *Attorney, Agent, or Firm*—Walter M. Douglas

(57) ABSTRACT

A method for manufacturing an EUV lithography element mirror includes sagging a plate of a glass material to produce an EUV mirror blank; and polishing a top face of the EUV mirror blank to produce a polished EUV mirror. A method for manufacturing an EUV lithography element mirror includes grinding a top face of a piece of a glass material; sagging a plate of the glass material over the top face of the piece to produce an EUV mirror blank; and polishing a top face of the EUV mirror blank to produce an EUV polished mirror.

16 Claims, 6 Drawing Sheets

U.S. PATENT DOCUMENTS

| | | | |
|---|---|---|---|
| 4,002,512 A | 1/1977 | Lim | 148/187 |
| 4,130,437 A | 12/1978 | Mazeau et al. | |
| 4,231,657 A | 11/1980 | Iwamatsu | 355/71 |
| 4,231,827 A | 11/1980 | Wilson et al. | |
| 4,282,021 A | 8/1981 | Mazeau et al. | |
| 4,344,816 A | 8/1982 | Craighead et al. | 156/643 |
| 4,411,013 A | 10/1983 | Takasu et al. | 378/34 |
| 4,776,696 A | 10/1988 | Hettrick et al. | 356/328 |
| 4,911,513 A | 3/1990 | Valette | 350/96.12 |
| 5,003,567 A | 3/1991 | Hawryluk et al. | 378/34 |
| 5,016,265 A | 5/1991 | Hoover | 378/43 |
| 5,043,002 A | 8/1991 | Dobbins et al. | 65/3.12 |
| 5,051,326 A | 9/1991 | Celler et al. | 430/5 |
| 5,146,482 A | 9/1992 | Hoover | 379/43 |
| 5,146,518 A | 9/1992 | Mak et al. | 385/41 |
| 5,152,819 A | 10/1992 | Blackwell et al. | 65/3.12 |
| 5,154,744 A | 10/1992 | Blackwell et al. | 65/3.12 |
| 5,165,954 A | 11/1992 | Parker et al. | 427/526 |
| 5,173,930 A | 12/1992 | Hoover | 378/85 |
| 5,220,590 A | 6/1993 | Bruning et al. | 378/34 |
| 5,304,437 A | 4/1994 | Tennant | 430/5 |
| 5,315,629 A | 5/1994 | Jewell et al. | 378/34 |
| 5,328,784 A | 7/1994 | Fukuda | 430/5 |
| 5,332,702 A | 7/1994 | Sempolinski et al. | 501/106 |
| 5,353,322 A | 10/1994 | Bruning et al. | 378/34 |
| 5,356,662 A | 10/1994 | Early et al. | 427/140 |
| 5,389,445 A | 2/1995 | Makowiecki et al. | 428/457 |
| 5,395,413 A | 3/1995 | Sempolinski et al. | 65/414 |
| 5,395,738 A | 3/1995 | Brandes et al. | 430/296 |
| 5,510,230 A | 4/1996 | Tennant et al. | 430/323 |
| 5,521,031 A | 5/1996 | Tennant et al. | 430/5 |
| 5,553,110 A | 9/1996 | Sentoku et al. | 318/35 |
| 5,565,030 A | 10/1996 | Kado et al. | 117/89 |
| 5,605,490 A | 2/1997 | Laffey et al. | 451/36 |
| 5,637,962 A | 6/1997 | Prono et al. | 315/111.21 |
| 5,698,113 A | 12/1997 | Baker et al. | 216/72 |
| 5,737,137 A | 4/1998 | Cohen et al. | 359/859 |
| 5,750,448 A | 5/1998 | Grabowski et al. | |
| 5,815,310 A | 9/1998 | Williamson | 359/365 |
| 5,868,605 A | 2/1999 | Cesna | 451/41 |
| 5,880,891 A | 3/1999 | Furter | 359/651 |
| 5,970,751 A | 10/1999 | Maxon et al. | 65/414 |
| 5,989,776 A | 11/1999 | Felter et al. | 430/270.1 |
| 6,013,399 A | 1/2000 | Nguyen | 430/5 |
| 6,048,652 A | 4/2000 | Nguyen et al. | 430/5 |
| 6,118,577 A | 9/2000 | Sweatt et al. | 359/351 |
| 6,178,221 B1 * | 1/2001 | Levinson et al. | 378/35 |
| 6,280,294 B1 | 8/2001 | Miyamoto | 451/34 |
| 6,312,317 B1 | 11/2001 | Oguma | 451/42 |
| 6,319,634 B1 * | 11/2001 | Berkey et al. | 430/5 |
| 6,368,942 B1 * | 4/2002 | Cardinale | 438/459 |
| 2001/0028462 A1 | 10/2001 | Ichihara et al. | 356/512 |

OTHER PUBLICATIONS

Isimoto Co., Ltd., Products for Optics, May 17, 1999, http://www.isimoto.ocm/isimoto/english/variation3.html, pp. 1–2.

Isimoto Co., Ltd., Product Information, May 17, 1999, http://www.isimoto.ocm/isimoto/english/procuct_info.html, pp. 1–4.

Isimoto Co., Ltd., Purity and Chemical Reactivity, May 17, 1999, http://www.isimoto.ocm/isimoto/english/feature1.html, pp. 1–3.

The Optics Mall—Equipment/Supplies, Universal Photonics, Inc., Jul. 7, 1999, p. 1.

Rodel Authored Papers: A Study of the Variation of Physical Properties in Random Lots of Urethane Polishing Pads for CMP, Jul. 7, 1999, http://www.rodel.com/publications/paper1.asp, pp. 1–4.

Rodel Publications Content, Rodel Authored Papers, Jul. 7, 1999, http://www.rodel.com/publications/content.asp, pp. 1–2.

Rodel Publications, Jul. 7, 1999, http://www.rodel.com/publications/default.asp, p. 1.

Cab–O–Sil Web Site, Jul. 7, 1999, http://www.cabot–corp.om/cabosil, pp. 1–3.

Optics and Photonics News, Aug. 1999, vol. 10, No. 8, Aug. 1999, pp. 34–38.

O.V. Mazurin, V. K. Leko and L.A. Komarova, Journal of Non–Crystalline Solids 18 (1975) 1–9, Crystallization of Silica and Titanium Oxide–Silica Corning Glasses (Codes 7940 and 7971), pp. 1–9.

S. T. Gulati and H.E. Hagy, Journal of the American Ceramic Society, vol. 61, No. 5–6 May–Jun., 1978, Theory of the Narrow Sandwich Seal, pp. 260–263.

Extreme Ultraviolet Lithography, A White Paper Prepared by: Charles Gwyn, et al. EUV LLC, Livermore, Ca., Nov. 1999, pp. 96–141.

H. E. Hagy and W. D. Shirkey, Determining absolute thermal expansion of titanica–silica glasses: a refined ultrasonic method, Sep. 1975, vol. 14, No. 9, Applied Optics, pp. 2099–2103.

S. F. Jacobs et al., Surface figure changes due to thermal cycling hysteresis, Applied Optics, vol. 26, No. 20, Oct. 15, 1987, pp. 4438–4442.

Richard H. Stulen and Donald W. Sweeney, Extreme Ultraviolet Lithography, IEEE Journal of Quantum Electronics, vol. 35, No. 5, May 1999, pp. 694–699.

EUV Lithography NGL Technology Review, Jun. 9, 1999.

P.C. Schultz et al., Ultra–Low–Expansion Glasses & Their Structure in the $SiO_2$ and $TiO_2$ System, Papers presented to the Third International Conf. on the Physics of Non–crystalline Solids, Sheffield University Sep., 1970, 453–461.

Gianoulakis et al. Proceedings Of the SPIE—The International Society for Optical Engineering (1999), vol. 3676, pt. 1–2, p. 598–605. Abstract Only.

* cited by examiner

METHOD TO AVOID STRIAE IN EUV LITHOGRAPHY MIRRORS

CROSS-REFERENCE TO RELATED APPLICATIONS

This application claims priority of provisional U.S. application Ser. No. 60/240,303, filed on Oct. 13, 2000, and entitled "Method to Avoid Striae in EUV Mirrors."

FIELD OF THE INVENTION

The present invention relates to extreme ultraviolet (EUV) mirrors for EUV lithography. More particularly, it relates to methods for manufacturing EUV mirrors.

BACKGROUND OF THE INVENTION

Extreme ultraviolet (EUV) lithography (EUVL) is a relatively new form of lithography. EUVL uses extreme ultraviolet (EUV, also called soft X-ray) radiation with a wavelength in the range of 10 to 14 nanometers (nm) to perform the imaging. Up to now, optical lithography has been the lithographic technique of choice in the high-volume manufacture of integrated circuits (IC). The constant improvement in optical lithography has allowed it to remain the semiconductor industry's workhorse through the 100 nm or smaller generation of devices. However, to pack even higher density circuits into IC chips, new technologies (Next-Generation Lithographies, NGL) will be required. EUVL is one NGL technology vying to become the successor to optical lithography.

In many respects, EUVL is similar to the optical lithography. For example, as illustrated in FIG. 1, the basic optical design for an EUVL system is similar to that of an optical lithographic system. It comprises a light source 1, a condenser 2, a mask (reticle) 4 on a mask stage 5, an optical system 6, and a wafer 7 on a wafer stage 8. Both EUV and optical lithographies use optical systems (cameras) to project images on the masks onto substrates which comprise silicon wafers coated with photo resists. However, the apparent similarity stops here. Because EUV is strongly absorbed by virtually all materials, EUV imaging must be performed in vacuum, which is achieved by enclosing the system in a chamber 3. In addition, the chamber 3 might be further partitioned into different compartments 10 and 20, which have their own vacuum systems. Because EUV is absorbed by most materials, there are no suitable lenses to focus and project an image on mask 4 onto a substrate (wafer) 7. As a result, it is necessary to operate EUVL in a reflective mode instead of a transmissive mode. In the reflective mode, light is reflected from mirrors (not shown; inside the optical system 6), instead of being transmitted through lenses. Even with reflective optics, there are not many materials capable of reflecting EUV. In order to achieve reasonable reflectivities at near normal incidence (i.e., an incident beam landing on the surface of a mirror at an angle close to normal to the surface), the surface of a mirror is typically coated with multilayer, thin-film coatings. These multilayer, thin-film coatings reflect EUV in a phenomenon known as distributed Bragg reflection.

The multilayer coatings for the reflective surfaces in EUVL imaging system consist of a large number of alternating layers of materials having dissimilar EUV optical constants. These multilayers provide a resonant reflectivity when the period of the layers is approximately $\lambda/2$, where $\lambda$ is the wavelength. The most promising EUV multilayers are coatings of alternating layers of molybdenuum (Mo) and silicon (Si). These layers are deposited with magnetron sputtering. Each layer of Mo or Si is coated to a thickness of $\lambda/4$ of the EUV light so that it will have a periodicity of $\lambda/2$. In this type of reflector, a small portion of the incident light is reflected from each silicon surface. The thickness of the layers causes the reflected light waves to interfere constructively. The more layers there are, the more light will be reflected. However, imperfections in the surface coating will eventually diminish the reflectivity return of more coatings. Currently, most mirrors in EUVL systems have around 40 alternating layer pairs of Mo:Si. Furthermore, most of these Mo:Si multilayers are optimized to function best with wavelengths at around 13.4 nm, which is the wavelength of a typical laser plasma light source.

A typical EUVL optical system or camera (see 6 in FIG. 1) consists of several mirrors (e.g., a four-mirror ring-field camera shown in FIG. 2). The mirrors that comprise the camera must have a very high degree of perfection in surface figure and surface finish in order to achieve diffraction limited imaging. It is predicted that the surface figure (basic shape) of each mirror must be accurate to 0.25 nm rms (root mean square) deviation, or better. In addition to surface figure, stringent requirement must also be placed on the finish of the surfaces. The challenge for a fabricator of optics for EUVL is to achieve the desired levels of surface figure accuracy and surface finish simultaneously.

FIG. 2 illustrates a typical prior art four-mirror optical system for EUVL application. Such an optical system is used to project and reduce an image from a mask onto a wafer. The reduction achieved by the optical system permits the printing of a image smaller than that on the mask onto a wafer. The projection operation is typically carried out in a step-and-scan process. In a step-and-scan operation, a light beam from a light source (see 1 and 2 in FIG. 1) is used to scan the image on the mask. The light beam L reflected from the mask is further reflected by four mirrors M1, M2, M3 and M4 in succession to project and reduce the image from the mask onto the wafer.

The high degree of precision in figure and finish required for EUVL imaging requires that the mirrors should be substantially invariant to environmental changes, e.g., temperature changes. In order to afford better thermal management, it is preferred that these mirrors be made of light weight materials with very low coefficients of thermal expansion (CTE). One promising material for such application is a ultra low expansion glass material, such as the ULE™ glass from Corning, Inc.

ULE™ glass has a CTE of about 0±30 ppb/° C. over the temperature range of 5 to 35° C. The CTE in ULE™ glass is a function of the titanium concentration. ULE™ glass typically contains about 6 to 8 wt. % of $TiO_2$. Compositions containing about 7 wt. % $TiO_2$ have near zero CTE. In addition to having extremely low thermal expansion, ULE™ glass is also unique in that it hAs no crystalline phase. In other words, ULE™ glass is completely amorphous. ULE™ glass is a high temperature glass which makes it unsuitable for manufacturing by conventional means. Instead of being poured, it is fabricated by a flame hydrolysis fused glass process which is similar in scope to chemical vapor deposition. In the flame hydrolysis process, high purity precursors of titanium oxide and silicon oxide are injected into flames to form deposit onto the surface of the growing glass. The process minimizes impurities such as sodium and other alkali or alkaline earth metals.

Due to its unique process of formation, ULE™ glass is formed in layer deposits. This means ULE™ glass inherently has striae, though these striae are not apparent and do not affect most applications. Although ULE™ glass has been polished to 0.5 Å rms (root mean square) surface roughness, the striae may present problems for stringent applications like EUV mirrors. For example, it can create a mid frequency surface structure that would cause image degradation in mirrors used in the projection systems for EUV microlithography.

FIG. 3A illustrates a piece of ULE™ glass 31, in which striae 32 are shown. When the striae are oriented perpendicular to the axis of a mirror and that mirror is subsequently ground and polished to a concave or convex shape, the striae planes are cut across. FIG. 3B shows a cylinder of ULE™ glass 33 with its top ground to give a convex surface. It is apparent that different layers of striae planes are cut across, leaving approximately concentric circles of striae edges 34. This is not a problem for applications where the source light is in the range of visible to infrared. However, in EUV lithography, which uses lights with wavelengths around 13 nanometer (nm), these striae edges 34 may manifest themselves as small ridges. These can cause aberrations which would degrade any images projected within the optical train. Although this problem is illustrated with ULE™ glass, the problem is not unique to this glass. The same problem due to striae will be encountered in any material that is prepared by gradual deposition of newly formed material onto the materials, like the flame hydrolysis process in the formation of ULE™ glass. Such materials, which inherently have striae, will be generally referred to as the ULE™ glass-like materials herein.

To make good use of the ULE™ glass-like materials, it is desirable to have methods that can reduce the striae effect in the manufacturing of EUV mirrors of ultra low expansion materials.

SUMMARY OF INVENTION

Embodiments of the invention relate to methods for manufacturing mirrors for use in EUV lithography. Some embodiments include sagging a plate of a glass material to produce a mirror blank; and polishing a top face of the mirror blank to produce a polished mirror. Other embodiments include grinding a top face of a piece of a glass material; sagging a plate of the glass material over the top face of the piece to produce a mirror blank; and polishing a top face of the mirror blank to produce a polished mirror. The glass material may be ultra low expansion glass material with a coefficient of thermal expansion of no more than 30 parts per billion per degree Celsius in a temperature range of 5 to 35° C.

Other aspects and advantages of the invention will be apparent from the accompanying descriptions and drawings.

DETAILED DESCRIPTION

Embodiments of the invention relate to methods for manufacturing EUV mirrors from the ULE™ glass-like materials. The invention significantly reduces the striae effects which might degrade image qualities.

Figure 1:
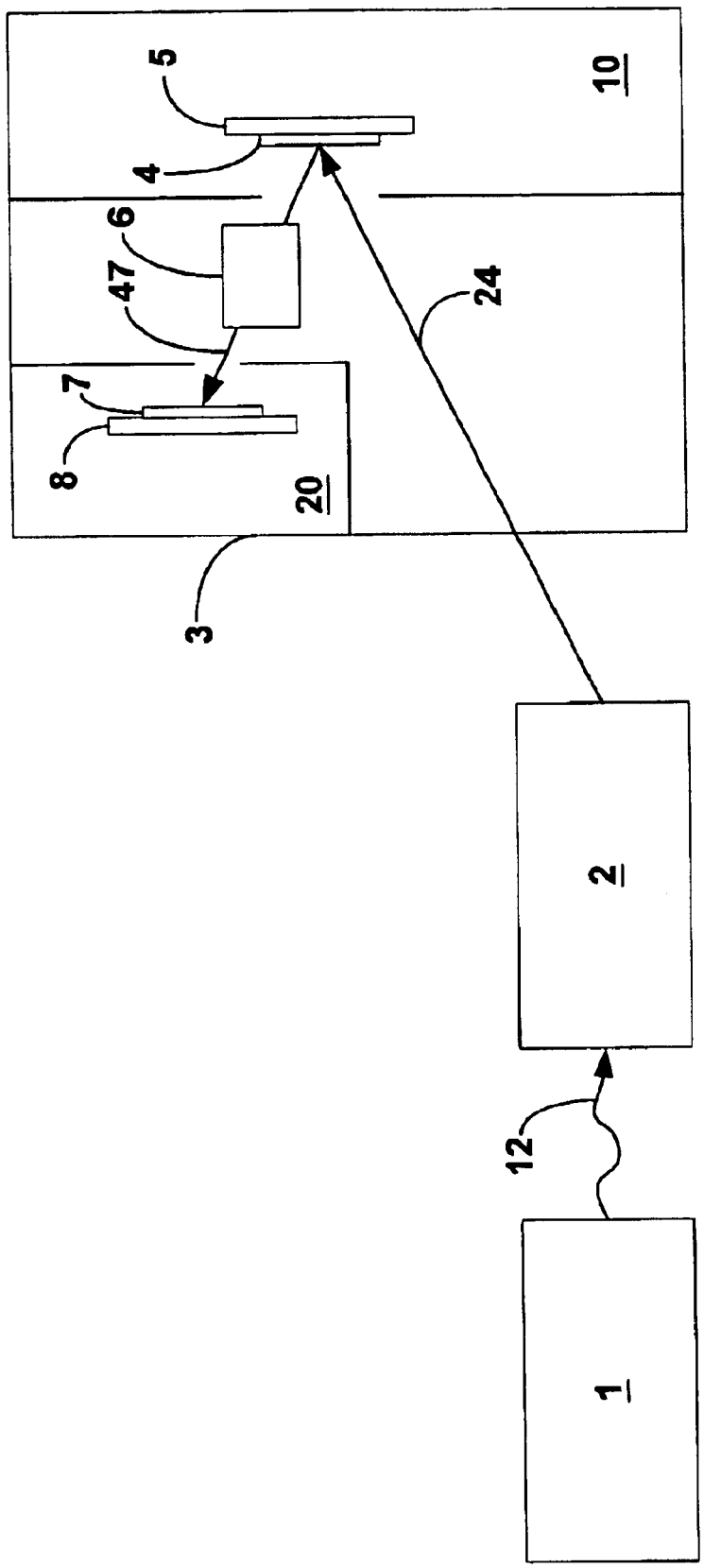
FIG. 1 is a diagram of a prior art EUVL system.
Figure 2:
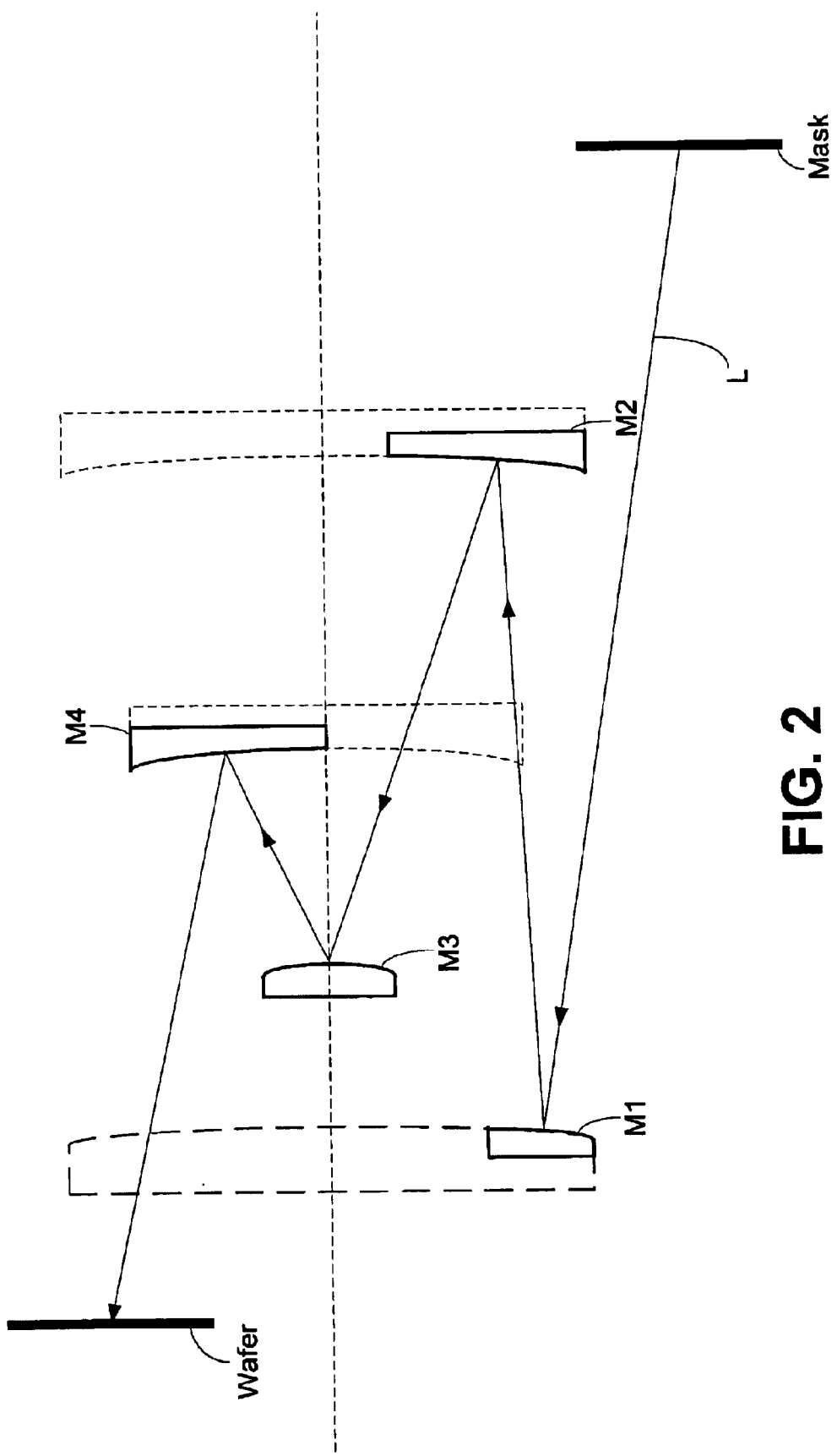
FIG. 2 is a diagram illustrating a prior art four-mirror optic system for an EUVL camera.
Figure 3A:
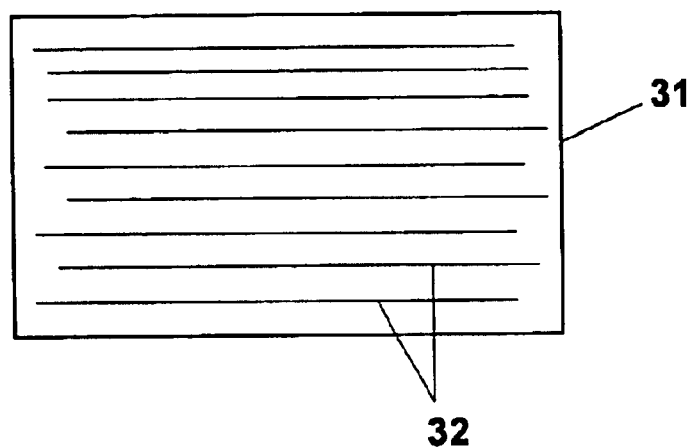
FIG. 3A is a diagram illustrating a piece of a ULE™ glass-like material having striae.
Figure 3B:
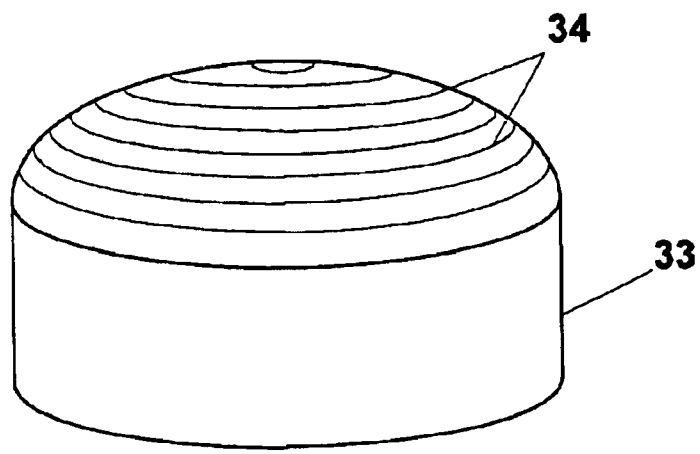
FIG. 3B illustrates a cylindrical piece of a ULE™ glass-like material. The top of the cylinder has been ground to a convex configuration.
Figure 4A:
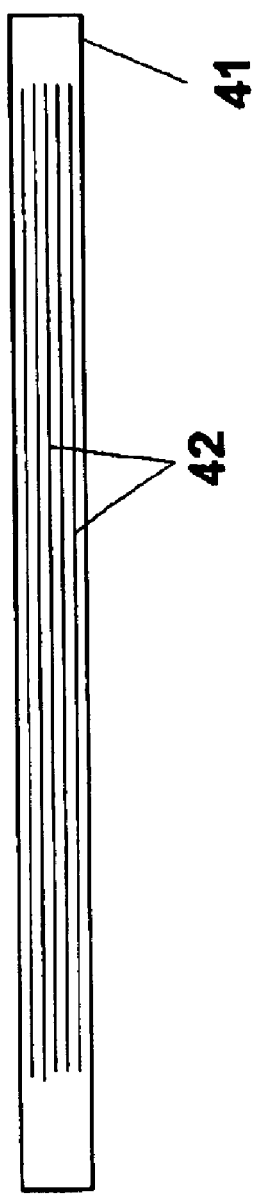
FIG. 4A is a diagram illustrating a side view of a thin plate of a ULE™ glass-like material showing striae on the side.
Figure 4B:
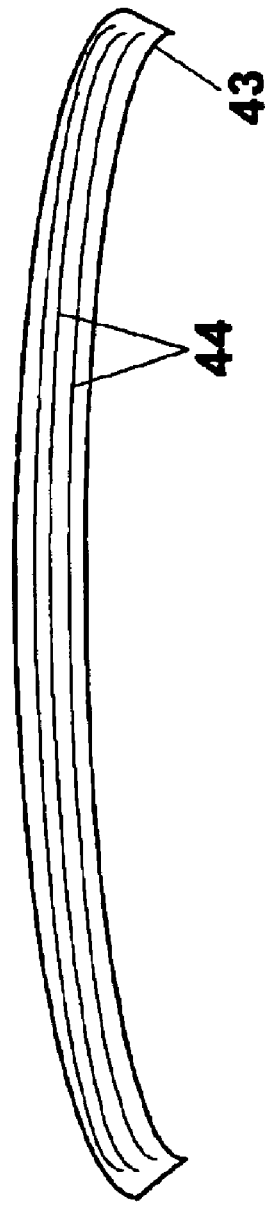
FIG. 4B shows the same side view after the thin plate was sagged to have a curved surface.

Some embodiments relate to methods of manufacturing thin-plate mirrors. FIG. 4A illustrates a side view of a thin plate 41, showing striae 42 on the side. The striae planes are parallel with the surfaces of the plate. If the surface of this plate were to be ground to the desired curvature, the grinding would cut across striae planes, and the above-mentioned problem will be unavoidable. According to one embodiment of the invention, as illustrated in FIG. 4B, instead, the thin plate 41 is "sagged" to the desired curved surface to produce a mirror blank 43, in which the striae planes 44 remain substantially parallel to the sagged, curved surface of the mirror. Because this sagged, curved surface has a near net shape of the final mirror, only minor polishing and grinding are required to produced a finished mirror. The problem associated with cutting across striae planes will be substantially eliminated. Sagging, as used herein, refers to the process of thermal deformation of a plate-like glass material. One skilled in the art would know that the exact conditions (temperature and duration) needed to achieve the desired degree of sagging will depend on the properties of the materials used. For ULE™ glass, a temperature of over 1300° C., preferably 1450–1500° C., is typically required.

The polishing or lapping of a finished mirror may be achieved by any method known in the art. When the mirror has been polished to the desired figure and finish, coating of molybdenum (Mo) and silicon (Si) can be accomplished with either magnetron sputtering, ion-beam sputtering, or other suitable methods. In a typical EUVL application, these mirrors should be coated with multiple alternating layers of Mo and Si. Polishing as used herein may include the Mo:Si coating step.

Other embodiments of the invention relate to methods of manufacturing thick mirrors. With thick mirrors, the above-described sagging method is not applicable. When a mirror is sagged over a form, the material flows. This makes it difficult to maintain enough material to have a desired thickness. This difficulty can be overcome by using a combination of sagging and grinding.

Figure 5A:
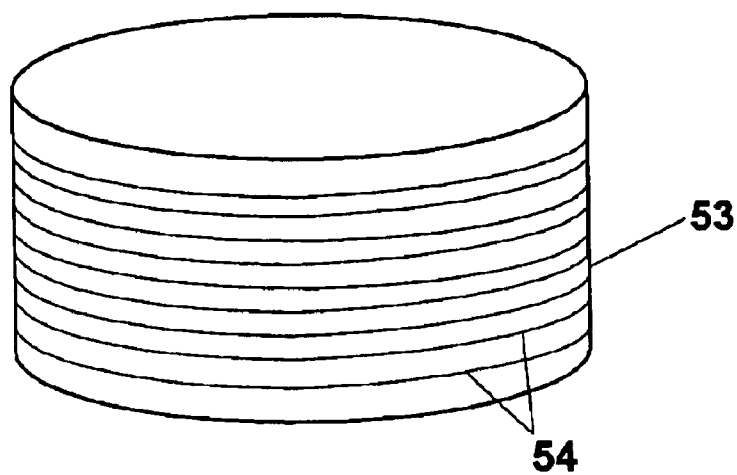
FIG. 5A is a diagram illustrating a cylinder of a ULE™ glass-like material having striae planes perpendicular to the axis of the cylinder.

According to one embodiment of the invention, FIG. 5A illustrates a thick cylindrical plate/block 53 showing that striae planes 54 are perpendicular to the axis of the cylinder. In this embodiment, this cylindrical block 53 is first ground to provide a top face with a shape near the net shape of the mirror. This produces a mirror base 55, which has a top face with striae planes cut through showing approximately concentric striae ridges 56. Once the mirror base is ground to a near net shape, a thin plate (see 61 in FIG. 6A) may be annealed (sagged) to this base.

Figure 5B:
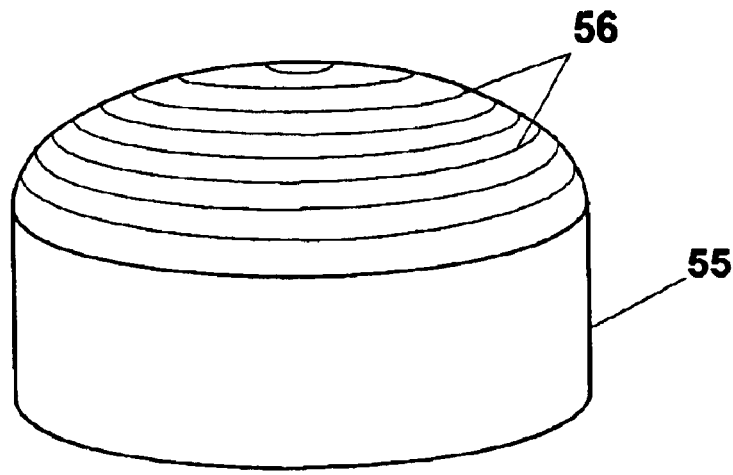
FIG. 5B is a convex mirror blank prepared from the cylinder shown in FIG. 5A, showing the concentric striae ridges on the convex surface.
Figure 6A:
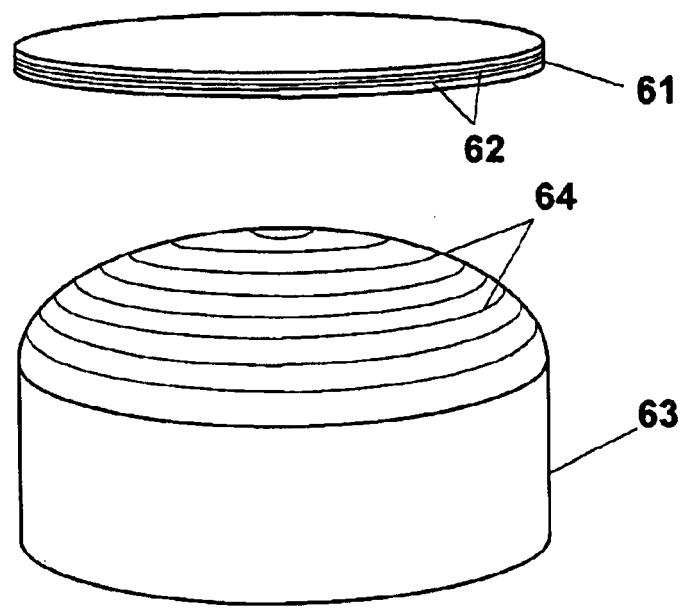
FIG. 6A shows a top plate made of a ULE™ glass-like material about to be attached to a mirror base with a convex top face.
Figure 6B:
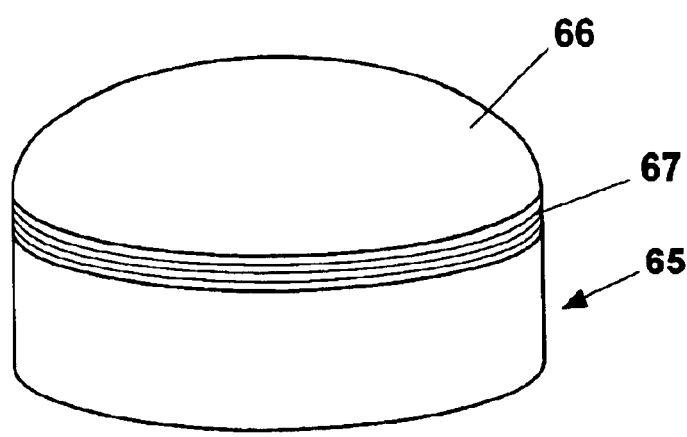
FIG. 6B shows a mirror blank with the top plate annealed to the base.

As illustrated in FIG. 6A, a thin plate 61 with striae planes 62 parallel with the surfaces of the plate may be sagged over the base 63, which is like the one shown in FIG. 5B. The mirror base 63 has a top face with a near net shape and striae ridges 64 due to cut through of striae planes. When the thin plate 61 is sagged over the top face of the mirror base 63, it produces a mirror blank 65, which is ready to be polished. Mirror 65 has a top face devoid of striae ridges because this top face is the top face of the thin plate 61 as shown in FIG. 6A. Sagging of thin plate 61 over the mirror base results in the striae planes 67 to remain parallel with the curved top face 66. Thus, in mirror blank 65, all striae ridges are on the side, instead of the top face. Because this mirror 65 has a near net shape, only minor grinding and polishing are needed to produce the finished mirror. This will eliminate or minimize the cutting through of the striae planes and the problems associated with it.

Several methods known in the art are suitable for annealing the top late 61 to the base 63. These include thermal fusion, frit fusion, and annealing using an adhesive (i.e., adhesion). With thermal fusion, the top plate 61 and the base 63 are fused (joined) by applying thermal energy to melt the regions at the joint. In frit fusion, low-melting frits (powders) of a glass material are added to the joint to "glue" the pieces together when heated. For example, U.S. Pat. No. 6,048,811, which was assigned to the same assignee herein, discloses a frit fusion process suitable for this process. Similarly, the annealing may be achieve by adhesion, i.e., by applying suitable adhesive materials at the joint. Suitable adhesive materials include, but not limited to, epoxies, silicone adhesives, and solder or bonding materials which, upon heating, will melt and form a bond between the base and the faceplate. When the faceplate is constructed of a material having a CTE closely equivalent or identical to that of the base, the adhesive should ideally match the CTE.

While the invention has been described using a limited number of embodiments, those skilled in the art, having the benefit of this disclosure, will appreciate that other variations are possible without departing from the scope of the invention as disclosed herein. Accordingly, the scope of the invention should be limited only by the attached claims.

What is claimed is:

1. A method for manufacturing an EUV lithography element, comprising:

sagging a plate of a glass material to produce a blank; and polishing a top face of the blank to produce a finished lithography element;

wherein striae planes in the sagged plate of glass material remain substantially parallel to the sagged, curved surface of the lithography element.

2. The method of claim 1, wherein the glass material is made by flame hydrolysis.

3. The method of claim 1, wherein the glass material comprises an ultra low expansion glass material.

4. The method of claim 3, wherein the ultra low expansion glass material has a coefficient of thermal expansion of 0±30 parts per billion per degree Celsius in a temperature range of 5 to 35 degrees Celsius.

5. A method for manufacturing a EUV lithography element, comprising:

grinding a top face of a piece of a glass material;

sagging a plate of the glass material over the top face of the piece to produce a blank; and polishing a top face of the blank to produce a finished lithography element;

wherein striae planes in the sagged plate of glass material remain substantially parallel to the sagged, curved surface of the lithography element.

6. The method of claim 5, wherein the glass material is made by flame hydrolysis.

7. The method of claim 5, wherein the glass material comprises an ultra low expansion glass material.

8. The method of claim 5, wherein the ultra low expansion glass material has a coefficient of thermal expansion of 0±30 parts per billion per degree Celsius in a temperature range of 5 to 35 degrees Celsius.

9. A method for manufacturing a mirror, comprising:

sagging a plate of a glass material to produce a mirror blank; and polishing a top face of the mirror blank to produce a finished mirror;

wherein striae planes in the sagged plate of glass material remain substantially parallel to the sagged, curved surface of the mirror.

10. The method of claim 9, wherein the glass material is made by flame hydrolysis.

11. The method of claim 9, wherein the glass material comprises an ultra low expansion glass material.

12. The method of claim 11, wherein the ultra low expansion glass material has a coefficient of thermal expansion of 0±30 parts per billion per degree Celsius in a temperature range of 5 to 35 degrees Celsius.

13. A method for manufacturing a mirror, comprising:

grinding a top face of a piece of a glass material;

sagging a plate of the glass material over the top face of the piece to produce a mirror blank; and polishing a top face of the mirror blank to produce a finished mirror;

wherein striae planes in the sagged plate of glass material remain substantially parallel to the sagged, curved surface of the lithography element.

14. The method of claim 13, wherein the glass material is made by flame hydrolysis.

15. The method of claim 13, wherein the glass material comprises an ultra low expansion glass material.

16. The method of claim 13, wherein the ultra low expansion glass material has a coefficient of thermal expansion of 0±30 parts per billion per degree Celsius in a temperature range of 5 to 35 degrees Celsius.

* * * * *